(No Model.)
G. NYE.
SLED.
No. 249,081. Patented Nov. 1, 1881.
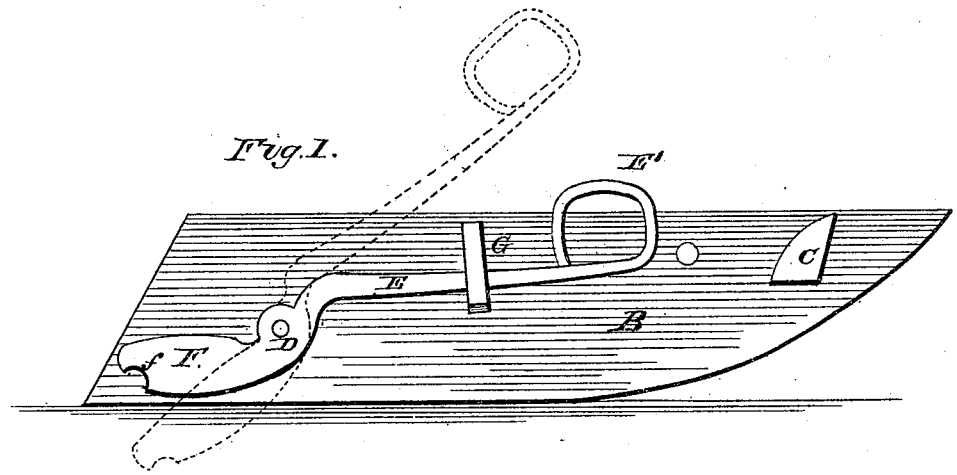
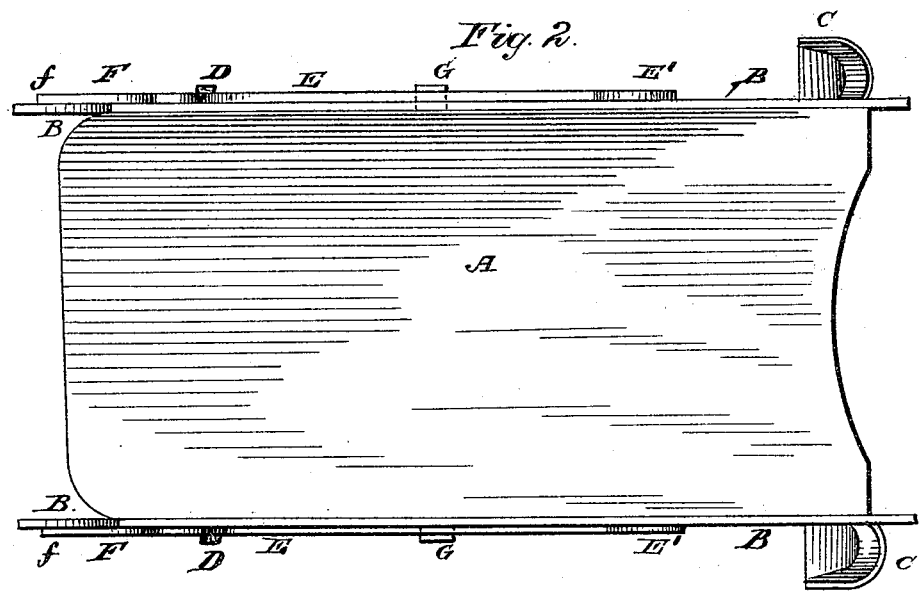
WITNESSES
Fred. G. Dieterich
Joseph I. Power
George Nye,
INVENTOR,
By his Attorneys,
Louis Bagger & Co.

UNITED STATES PATENT OFFICE.

GEORGE NYE, OF CENTRAL FALLS, RHODE ISLAND.

SLED.

SPECIFICATION forming part of Letters Patent No. 249,081, dated November 1, 1881.

Application filed April 22, 1881. (No model.)

*To all whom it may concern:*

Be it known that I, GEORGE NYE, of Central Falls, in the county of Providence and State of Rhode Island, have invented certain new and useful Improvements in Sleds; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation, and Fig. 2 is a plan or top view.

Similar letters of reference indicate corresponding parts in both the figures.

My invention has relation to a combined guide and brake attachment for sleds or sleighs; and it consists in the construction of the same, as hereinafter more fully described, and particularly pointed out in the claim.

In the annexed drawings, A represents the top or platform, and B the runners, of a sled. In the front end of each of the runners is a foot-rest, C, and in the rear part is a stud or pin, D, which forms a fulcrum for the brake-levers. The latter consist of an arm, E, bent to form a convenient gripe or handle, E', at the forward end, and a shoe, F, curved or rounded like a skate at its front end, and having a notch, $f$, at its extreme rear end. The arm or lever E rests in a keeper, G, affixed to the runner, when the guide or brake is not in use.

The operation of this device or attachment is as follows: To guide the sled, the occupant, placing his feet in the rests C C, slightly elevates arm E E' on that side of the sled in the direction of which he desires it to turn. To stop the sled the arms are both pulled up simultaneously into an approximately vertical position, as shown in dotted lines, which brings the notched rear end of the shoes F into operation, and, so to speak, hooks the sled to the ground, so as to stop it almost instantaneously, even on a steep downgrade.

I am aware that sleds or sleighs have been made before with levers hinged to the sides of the runners and terminating in a bent arm or brake-shoe, and I do not, therefore, claim such construction broadly; but it will be seen that the part F of my combined guide and brake is not set at right angles to the lever E, but merely bent in a downward direction, so as to form an easy curve, by which the course of the sled may be guided without perceptibly decreasing its speed when it goes down an inclined plane. At the same time the sled may be stopped almost instantly, when desired, by raising levers E sufficiently high to cause the notched or hooked rear end, $f$, of the brake-shoe to engage with the ground, which is facilitated by raising the rear end of the runners from the ground by tilting the front end of the sled downward, which is effected by the occupant partially standing or throwing his weight in the foot-rests or stirrups C C.

Having thus described my improvement, what I claim, and desire to secure by Letters Patent, is—

The combination, with the sled A, having runners B B, provided at their forward end with the fixed laterally-projecting foot-rests or stirrups C C, and having keepers G G, of the brake-levers E, (one on each side,) the rear ends of which form the curved shoes F, notched at $f$ to form a hook at the extreme rear end, as shown and specified, for the purpose set forth.

In testimony that I claim the foregoing as my own I have hereunto affixed my signature in presence of two witnesses.

GEORGE NYE.

Witnesses:
 WM. H. JOHNSON,
 HENRY E. WHIPPLE.